United States Patent [19]

Stupakis

[11] Patent Number: 4,733,438
[45] Date of Patent: Mar. 29, 1988

[54] COOLANT HOSE CLAMP

[75] Inventor: John S. Stupakis, Arcadia, Calif.

[73] Assignee: JSS Scientific Corporation, Arcadia, Calif.

[21] Appl. No.: 33,243

[22] Filed: Apr. 2, 1987

[51] Int. Cl.$^4$ .................. B65D 63/00; F16L 19/00
[52] U.S. Cl. .............................. 24/19; 24/268; 285/358
[58] Field of Search ............... 24/19, 268, 279; 285/90, 257, 249, 243, 314, 322, 357, 358, 394

[56] References Cited

U.S. PATENT DOCUMENTS

| 261,190 | 7/1882 | Walker | 285/358 |
|---|---|---|---|
| 965,286 | 7/1910 | Ferguson | 285/314 |
| 996,023 | 6/1911 | McAdoo | 285/358 |
| 1,390,564 | 9/1921 | Knorr | 285/243 |
| 1,486,421 | 3/1924 | Dyer | 285/249 |
| 1,728,588 | 9/1929 | Bache | 285/358 |
| 2,403,449 | 7/1946 | Meyer et al. | 285/252 |
| 2,489,919 | 11/1949 | Merriman | 285/357 |
| 3,158,388 | 11/1964 | Marshall | 285/259 |
| 4,563,795 | 1/1986 | Fournier | 24/19 |

Primary Examiner—Victor N. Sakran
Attorney, Agent, or Firm—John G. Mesaros

[57] ABSTRACT

A coolant hose clamp, in which an outer ring is provided with an inner cam surface configured for radial displacement of a plurality of arcuately configured clamping shoes, positioned within a retaining ring assembly. Rotation of the cam ring by a simple turning motion through a small angle relative to the retaining ring assembly actuates the clamping shoes radially inwards into clamping engagement with a flexible hose on a rigid fitting.

18 Claims, 4 Drawing Figures

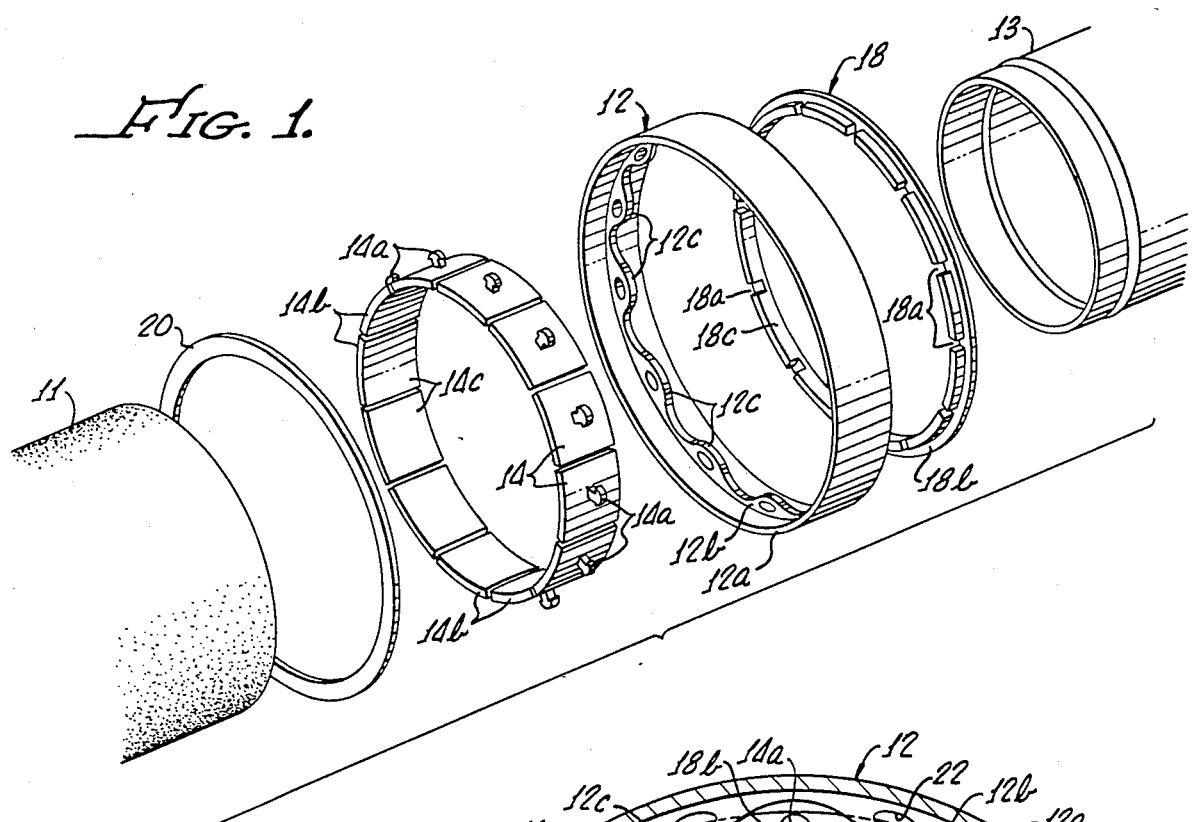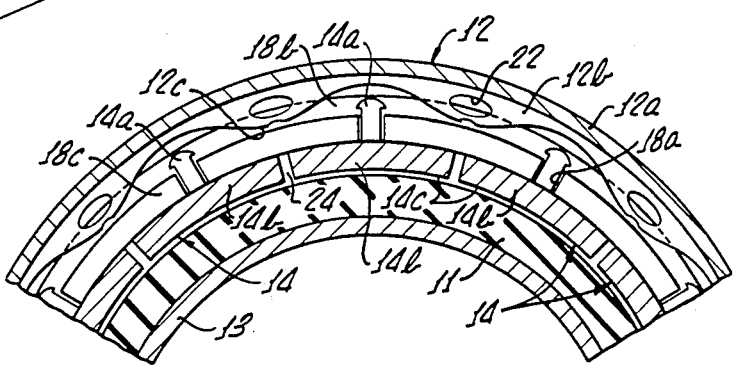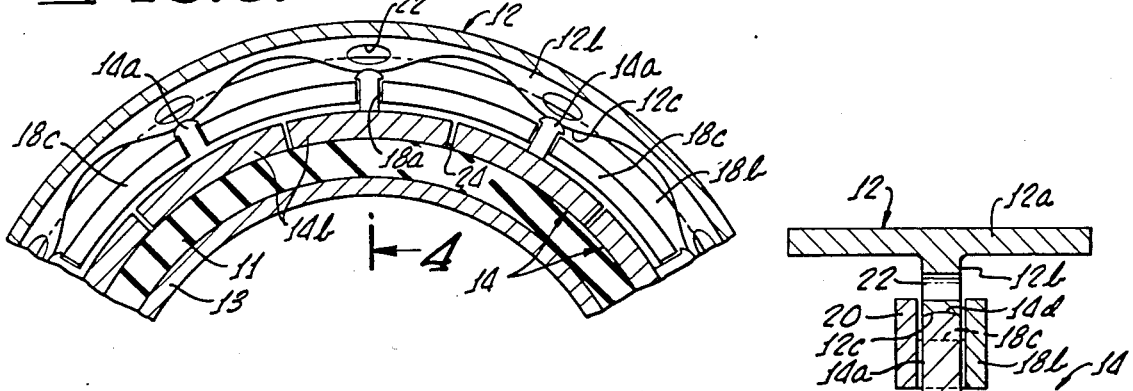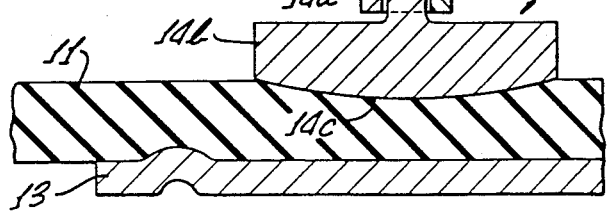

COOLANT HOSE CLAMP

BACKGROUND OF THE INVENTION

The background of the invention will be discussed in two parts.

FIELD OF THE INVENTION

This invention relates to hose clamps, and more particularly, to a coolant hose clamp with connection enabled by a simple manual twisting motion of an outer ring member.

DESCRIPTION OF THE PRIOR ART

In many applications employing coolants, such as in motor vehicle applications, where water or similar fluid is used to cool an internal combustion engine, flexible hoses interconnect various parts of the cooling system. In such applications, the engine, radiator and other components are provided with tubular metal fittings at the point of interconnection with the flexible tubing or hoses. For providing a secure connection, a clamp is placed over an end of the flexible hose, after which the inner opening of the hose is forced over the fitting. The clamp is then positioned over the hose end above the fitting, and the clamp is tightened.

Prior art clamps for such use have included clamps formed of a strip of metal with laterally extending grooves, the grooves coacting with the thread portion of a threaded fastener within a clamp block attached to one end of the strip, with the other end of the strip looped through an opening in the block for engagement of the thread with the grooves. Rotation of the fastener relative to the clamp block then effectively reduces the diameter of the loop to apply clamping pressure.

Another such hose clamp is formed of bent generally rigid wire formed in a loop, with overlying unconnected ends. One end of the loop captively receives a threaded block. The adjacent unconnected end is provided with a block member engaging an and of a threaded fastener passing through the block. Tightening of the fastening member applies clamping pressure.

U.S. Pat. No. 1,486,421, entitled "Hose Coupling", issued to Dyer on Mar. 11, 1924, and discloses a metal fitting having a tapered tubular portion insertable into the open end of a flexible hose, with a fingered clamping element received on the outside of the hose for engagement by a frusto-conical sleeve member threadably tightened to urge the fingers into engagement with the hose outer surface.

U.S. Pat. No. 2,403,449, entitled "Hose Clamp" issued to Meyer et al on Nov. 24, 1964, and shows a hose clamp with an inner compressor band urges inwardly by compressor shoe members having provision on the outer diameter thereof for retaining a flexible circumferential metal strap having opposite ends configured for captive retention of journal members, through which pass a threaded fastener.

An "Hose Coupling Connection" is shown and described in U.S. Pat. No. 3,158,388, issued to Marshall on Nov. 24, 1964. The coupling includes a plurality of wedge segments retained at the juncture of sleeves which are drawn together by axially extending bolt members spaced about the perimeter, with tapered coacting surfaces urging the segments into clamping engagement with a hose encircling a hose nipple.

A "Conduit Clamp" is shown in U.S. Pat. No. 4,563,795, issued to Fournier on Jan. 14, 1986, the clamp using a screw actuated circumferentially contractable band carrying a plurality of clamping segments.

Such prior art clamp members rely on the use of threaded fasteners to provide the necessary clamping pressures.

In accordance with an aspect of the present invention, it is accordingly an object of the invention to provide a new and improved quick disconnect manually operable coolant hose clamp.

SUMMARY OF THE INVENTION

The foregoing and other objects of the invention are accomplished by providing a quick disconnect coolant hose clamp, in which an outer ring is provided with an inner cam surface configured for simultaneous radial displacement of a plurality of arcuately configured clamping shoes, positioned within a retaining ring assembly. Rotation of the cam ring by a simple turning motion through a small angle actuates the clamping shoes into clamping engagement with a flexible hose on a rigid fitting.

Other objects, features and advantages of the invention will become readily apparent from a reading of the specification, when taken in conjunction with the drawings, in which like reference numerals refer to like elements in the several views.

BRIEF DESCRIPTION OF THE DRAWINGS

FIG. 1 is an exploded perspective view of the coolant hose clamp according to the invention, in exploded relation to a hose and hose fitting;

FIG. 2 is a partial front elevational view of the clamp of FIG. 1, partiallybroken away and partially in cross-section, with the clamping shoe members in the released position;

FIG. 3 is a partial front elevational view of the clamp of FIG. 1, similar to FIG. 2, with the clamping shoe members thereof in the engaged position; and FIG. 4 is a cross-sectional view of the clamp of FIG. 1, as viewed generally along line 4—4 of FIG. 3.

DESCRIPTION OF THE PREFERRED EMBODIMENT

Referring now to the drawings, and particularly to FIGS. 1, 2 and 3, there is shown a coolant hose clamp assembly, generally designated 10, the component parts of which include the outer cam ring 12, a plurality of clamping shoe members 14, and a clamping shoe retainer assembly formed of a radially slotted shoe retaining ring member 18 and a locking ring member 20. As shown in FIG. 2, the clamp assembly 10 is received over a flexible hose member 11, the inner opening of which has been positioned on a generally rigid tubular pipe fitting 13.

The cam ring 12 is formed as a generally rigid member with an outer cylindrical hand gripping portion 12a and an inner web portion configured to provided a cam surface 12b configured as a continuous sinusoid about a radius. The cam surface 12b is centrally disposed relative to the sides of the portion 12a, and lies in a plane generally perpendicular thereto. The configuration of the cam surface 12b is such that it produces a plurality of equiangularly disposed radially inwardly extending generally identically contoured cam edges 12c. The apex portion of each of the cam edges 12c is detented as shown in FIGS. 2 and 3, with an ovate opening 22 in the cam surface 12b radially outwardly from each detent.

The openings 22 are in proximate relation to the detent, and serve to provide a thin strip of material at the detent area, thus providing a slight amount of resilience at the detent portion of the cam edges 12c.

The clamping shoe retaining ring assembly has the retaining ring member 18 configured as a radially slotted member with a plurality of equiangularly disposed radially extending slots 18a, the number of such slots corresponding to the number of contoured cam edges 12c. As shown in FIG. 1, in cross-section, the shoe retaining ring member 18 is generally L-shaped, with a flange portion 18b, and an inwardly disposed hub portion 18c having a diameter slightly smaller than the largest diameter of the flange portion 18b. The outer diameter of the flange portion 18b is slightly less than the inner diameter of the gripping portion 12a of the cam ring 12, and slightly greater than a diameter of a circle encompassing all of the cam edges 12c of the cam ring 12. The outer diameter of the hub portion 18c of the ring member 18 is slightly smaller than the diameter of a circle which encompasses all of the cam edges 12c.

Upon assembly, the shoe retaining ring member 18 is fitted into one side of the cam ring 12, with the side of the flange portion 18b in proximate relation to the side of the cam surface 12b. In this position, the outer periphery of the hub portion 18c is in proximate relation to the cam follower edges 12c (See FIGS. 2 and 3). The locking ring member 20 is configured to dimensions generally identical to the dimensions of the flange portion 18b, and is suitably secured to the periphery of the hub portion 18c, such as by welding, to complete the retaining ring assembly (after the clamping shoe members 14 have been assembled to the hub portion 18c). The locking ring 20 then has the side thereof in proximate relation to the adjacent side of the cam edge 12b of the cam ring 12. The lateral dimension of the hub portion 18c is slightly greater than the width of the web forming the cam surface 12b. The width of each slot 18a of the hub portion 18c is dimensioned for movably receiving therein a stem portion or piston portion 14a of the clamping shoe member 14.

The piston portion 14a of the shoe member 14 is generally rod-shaped with the shoe portion 14b being arcuately configured in side elevation (See FIGS. 1, 2 and 3) and somewhat rectangular in cross-section. The hose contact surface 14c of the shoe portion 14b, in end elevation, (See FIG. 4) has a convex surface in the circumferential direction to provide maximum clamping pressure. The piston portion 14a is disposed generally centrally relative to the arcuate and lateral dimensions of the shoe portion 14b and in a direction perpendicular to a tangent of the upper surface thereof. The free end of the piston portion 14a terminates in a mushroom-shaped configuration to provide a radiused cam follower lobe 14d for coaction with, and detenting within, the detents of the cam edges 12c of the cam ring 12.

Referring also to FIGS. 2 and 3, the mushroom-shaped configuration of the cam follower lobes 14d serve a secondary purpose of retaining the clamp shoe members 14 within the slots 18a for limited displacement in the radial direction. As can be seen in FIGS. 2 and 3, the width of the cam follower lobe 14d in the circumferential direction is greater than the dimension of the slot 18a, thus serving to limit the inward radial displacement of the shoe member 14 while preventing it from falling out of the retaining ring assembly.

As best shown in FIG. 1, the contact surfaces 14c of the clamp shoe members 14, in end-to-end assembled relation, define a circular substantially continuous surface for contact with the outer surface of hose 11. In the illustrated embodiment of the clamp assembly 10, there are twelve identically configured clamp shoes 14, with the slots 18a being positioned at thirty degree intervals. The opposing circumferentially located edges of each shoe portion 14b, in front elevation (See FIGS. 2 and 3), define an angle of twenty-nine degrees, thus providing a minute gap 24 between adjacent ends of adjacent clamp shoe members 14, which gap generally corresponds to about one degree.

FIG. 2 depicts the clamp 10 in its release position, that is, prior to clamping of the hose 11 to the fitting 13. In this position, the cam edges 12c of the cam ring 12 are displaced circumferentially relative to the radiused cam follower lobes 14d of the clamp shoe members 14. That is, the axial direction of the piston portions 14a define an angle of fifteen degrees relative to a radius drawn through the apex of the adjacent cam edges 12c. In this position, the shoe surfaces 14c of the clamp shoe members 14 are in proximate relation to the outer surface of the hose 11. FIGS. 3 and 4 depict the clamp 10 in its engaged position, that is, as shown in FIG. 3, with the radiused cam follower lobes 14d detented within the detents of the cam edges 12c, and, as shown in FIG. 4, with the clamp shoe surfaces 14c urging against the surface of the hose 11 for enabling captive retention of the hose 11 on the fitting 13. As can be seen in FIG. 4, the convex shoe contact surface 14c facilitates the application of maximum pressure to the hose 11.

In the engaged position, by reference to FIG. 3, the shoe portions 14b are displaced radially inwardly relative to the arcuate segments of the hub portion 18c of the shoe retaining ring member 18. The gaps 24 are reduced in circumferential dimension, but are not eliminated. The outwardly protruding portions of the lobes 14d are in proximate relation to the upper edges of the hub portion 18c.

For engagement of the clamp 10, from the position shown in FIG. 2, the outer cam ring 12 is rotated through an angle of fifteen degrees until the cam edges 12c engage the cam follower lobes 14d, with additional pressure effecting detenting coaction, which can be felt by hand during manipulation, thus signifying engagement. During this relative displacement, due to the ovate openings 22, the detent portions of the cam edges 12c flex slightly and, upon detenting, provide a positive radially inwardly directed bias. For disengagement, the cam ring 12 is then rotated again through an angle of fifteen degrees to release the pressure from the clamping shoe members 14, and thus enable sliding of the clamp 10 back over the hose 11 for removal thereof. To facilitate gripping of the cam ring 12, the outer gripping surface thereof may be suitably knurled or abraded for ease of grasping.

Although there has been described a clamp 10 with twelve shoe members 14, it is to be understood that any other number may be conveniently employed, depending on the hose diameter with which it is to be used. In accordance with the invention, all parts may be fabricated of metal, or high strength heat resistant plastic materials, or a combination of both, with the method of securing the retaining ring member 18 and the locking ring member 20 being dependent on the material employed.

It is further to be understood that although the description has proceeded with reference to a plurality of identically configured clamp shoes, with equiangular disposition of the cam edges and cam follower lobes, the shoes may be configured differently with the coacting camming points occurring at different angles of rotation of the cam ring 12 relative to the retaining ring 18, thus enabling sequential application of radial force to successively actuated clamp shoes.

While there has been shown and described a preferred embodiment, it is to be understood that various other adaptations and modifications may be made within the spirit and scope of the invention.

What I claim is:

1. A hose clamping device comprising:
   a pluraliy of clamping means, each of said clamping means including a piston portion and a shoe portion configured for clampingly engaging a portion of the periphery of a hose;
   means including slot means for receiving said piston portions therein for retaining said clamping means with said shoe portions in contiguous relation, with said shoe portions generally defining a circular hose receiving opening;
   a cam member having a plurality of cam edges generally equal in number to said plurality of clamping means; and
   cam follower means on each of said clamping means responsive to angular displacement of said cam member relative to said retaining means for radially displacing said shoe portions of said clamping means relative to the periphery of a hose within said hose receiving opening.

2. The clamping device of claim 1 wherein said retaining means includes a retaining ring assembly.

3. The clamping device of claim 2 wherein said cam follower means are integrally formed with said clamping means.

4. The clamping device of claim 3 wherein said clamping means includes an arcuately configured shoe portion and said cam follower means is an integrally formed piston portion having a lobed end portion.

5. The clamping device of claim 4 wherein said cam member is a cam ring having an inner sinusoidally configured edge for forming said cam edges.

6. The clamping device of claim 1 wherein said cam member is a cam ring having an inner surface configured for providing a plurality of equiangularly disposed radially inwardly extending generally identically contoured cam edges.

7. The clamping device of claim 6 wherein said retaining means is configured for retaining a plurality of equiangularly disposed generally identically configured radially displaceable clamping means, each of which is provided with cam follower means for coaction with said cam edges.

8. The clamping device of claim 1 wherein the shoe portion of each of said clamping means is arcuately configured in the direction of contiguous positioning relative to an adjacent shoe portion.

9. The clamping device of claim 8 wherein the shoe portion of each of said clamping means has a surface which is convex in end elevation for coaction with the periphery of a hose received in said opening.

10. A hose clamping device comprising:
    an outer ring member of generally circular cross-section configured for hand grasping and having cam means on the interior thereof;
    retaining means assembled relative to said ring member for rotational displacement relative thereto, said retaining means includes hub means having radially extending slots therein;
    a plurality of clamping means, each of said clamping means including a shoe portion configured for clampingly engaging a portion of the periphery of a hose, and each of said clamping means including a portion within a corresponding slot of said hub means;
    means for assembling said clamping means to said retaining means for limited radial displacement relative thereto, with said shoe portions in contiguous relation and defining a generally circular hose receiving opening; and
    cam follower means in coacting engagement with said cam means and responsive to angular displacement of said outer ring member relative to said retaining means for radially displacing said shoe portions of said clamping means relative to the periphery of a hose within said hose receiving opening.

11. The clamping device of claim 10 wherein said cam means are integrally formed with said outer ring member.

12. The clamping device of claim 11 wherein said cam follower means are integrally formed with said clamping means.

13. The clamping device of claim 10 wherein said portion of said clamping means is a piston portion slidably received within said slot, and said cam follower portion is a cam lobe formed on the radially outermost part of said piston portion.

14. The clamping device of claim 13 wherein said cam means are integrally formed with said outer ring member and include a plurality of cam edges equal in number to the number of said clamping means.

15. The clamping device of claim 14 wherein each of said cam edges includes detent means for coacting engagement with said cam lobes.

16. The clamping device of claim 15 wherein each of said cam edges is configured to provide a measure of resilience during coaction of said cam lobes with said detent means.

17. A hose clamping device comprising:
    a plurality of clamping means, each of said clamping means having a piston portion, a lobe portion and a shoe portion, said shoe portion being configured for clamping engaging a portion of the periphery of a hose,
    retaining means including hub means hub having radially extending slots therein, the piston portion of each of said clamping means being positioned within a corresponding slot of said hub means for limited radial displacement relative thereto, with said shoe portions in contiguous relation and defining a generally circular hose receiving opening;
    an outer ring member of generally circular cross-section configured for hand grasping assembled relative to said retaining means for rotational displacement related thereto, said ring member including means for coacting engagement with said lobe portions and responsive to angular displacement of said outer ring member relative to said retaining means for radially displacing said shoe portions of said clamping means relative to the periphery of a hose within said hose receiving opening.

18. The clamping device of claim 17 wherein said mean on said outer ring member for coacting engagement with said lobe portions includes cam means.

* * * * *